(12) United States Patent
Jennings et al.

(10) Patent No.: US 8,713,053 B2
(45) Date of Patent: Apr. 29, 2014

(54) ACTIVE TAGS

(75) Inventors: Cullen F. Jennings, Santa Cruz, CA (US); Joseph Brian Burton, Livermore, CA (US); Thomas M. Wesselman, Issaquah, WA (US); Shantanu Sarkar, San Jose, CA (US)

(73) Assignee: Cisco Technology, Inc, San Jose, CA (US)

( * ) Notice: Subject to any disclaimer, the term of this patent is extended or adjusted under 35 U.S.C. 154(b) by 246 days.

(21) Appl. No.: 12/720,463

(22) Filed: Mar. 9, 2010

(65) Prior Publication Data

US 2011/0225193 A1  Sep. 15, 2011

(51) Int. Cl.
 *G06F 17/30* (2006.01)
(52) U.S. Cl.
 USPC ............................ 707/782; 707/769; 707/778
(58) Field of Classification Search
 USPC ................. 707/769, 776, 777, 778, 782
 See application file for complete search history.

(56) References Cited

U.S. PATENT DOCUMENTS

| | | | |
|---|---|---|---|
| 6,539,376 B1 | 3/2003 | Sundaresan et al. | |
| 6,882,747 B2 | 4/2005 | Thawonmas et al. | |
| 6,978,275 B2 | 12/2005 | Castellanos et al. | |
| 7,898,394 B2 * | 3/2011 | Hibbets | 707/707 |
| 7,953,736 B2 * | 5/2011 | Rinearson et al. | 707/736 |
| 2005/0246351 A1 | 11/2005 | Hadley et al. | |
| 2006/0277187 A1 * | 12/2006 | Roese et al. | 707/9 |
| 2008/0065995 A1 * | 3/2008 | Bell et al. | 715/751 |
| 2008/0077653 A1 * | 3/2008 | Morris | 709/203 |
| 2008/0222142 A1 * | 9/2008 | O'Donnell | 707/5 |
| 2009/0119370 A1 * | 5/2009 | Stern et al. | 709/206 |
| 2011/0035673 A1 * | 2/2011 | Chou et al. | 715/739 |
| 2011/0131218 A1 * | 6/2011 | Goldman et al. | 707/752 |

OTHER PUBLICATIONS http://www.npr.org/templates/story/story.php?storyId-4856924, "'Tagging' Lets Ordinary Users Organize the Internet," (Sep. 20, 2005).

* cited by examiner

*Primary Examiner* — Khanh Pham
(74) *Attorney, Agent, or Firm* — Brinks Gilson & Lione

(57) ABSTRACT

A method for retrieving data in a data source is provided. The method includes receiving a search term; identifying an active tag associated with the search term; correlating the active tag to dynamic data that is operative to adapt to a mining context in which data is stored; and retrieving the data using the dynamic data.

17 Claims, 8 Drawing Sheets

ACTIVE TAGS

FIELD

The present embodiments relate generally to metadata tags.

BACKGROUND

Tags may be keywords or terms assigned to information, such as an Internet bookmark, digital image, or computer file. Tags allow information to be found by browsing or searching for the tags and extracting the information associated with the tag. Tags are generally chosen informally and personally by the information's creator or by its viewer.

DESCRIPTION

Overview

Figure 1:
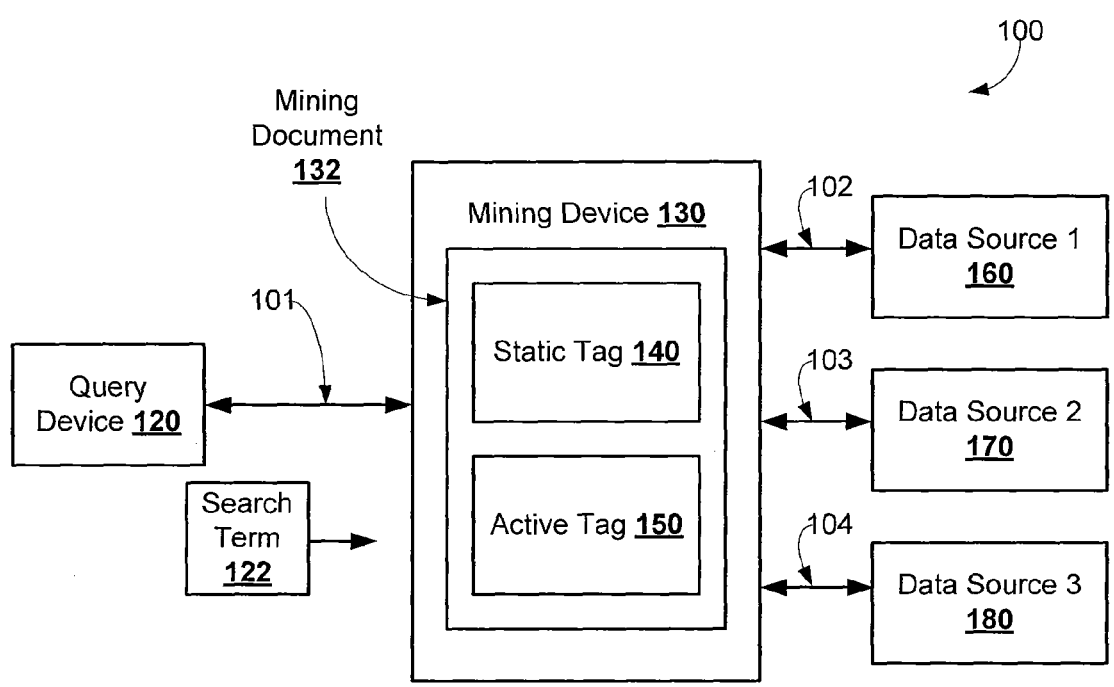
FIG. 1 illustrates one embodiment of a cross-domain tagging system that uses static tags and active tags.

The present embodiments relate to active tags. In one embodiment, active tags may be used in a cross-domain tagging system. A cross-domain tagging system may include a query device, mining device, one or more data sources, or a combination thereof. The query device may transmit a search term to the mining device. The mining device may identify an active tag associated with the search term. The active tag may be used to dynamically mine information, for example, by using dynamic data in, associated with, or related to the active tag. Dynamic data may be a policy, application, contextual information, one or more active tags, or other adaptive information. The dynamic data may be used to adapt to a mining context across one or more domains. In other words, information may be mined from one or more data sources. The dynamic data may be used to obtain information associated with, related to, or otherwise linked with the search term.

One benefit of active tags is that accurate, up-to-date information may be retrieved and provided to a user. Since the active tag is associated with dynamic data, instead of, for example, the actual information being searched for, the dynamic data may be used to obtain information in real time, as opposed to information that was originally associated with a tag.

Active tags may be used to mine information from multiple data sources. Accordingly, active tags may be used to retrieve information from a first data source and combine the information with information from a second data source. The dynamic data associated with the active tag may be used to intelligently obtain and combine the information in the first and second data sources.

In one aspect, a method includes receiving a search term, identifying an active tag associated with the search term, and correlating, using a processor, the active tag to dynamic data that is operative to adapt to a mining context in which data is stored and obtain data located in a data source. The method also includes initiating retrieval of the data using the dynamic data.

In a second aspect, an apparatus includes a processor and a memory coupled with the processor. The memory stores instructions operable to receive a search term from a query device, identify an active tag associated with the search term, and correlate the active tag to dynamic data that is operative to adapt to a mining context in which data is stored, and initiate retrieval of the data using the dynamic data. The dynamic data is an application, policy, additional active tag, or contextual data.

In a third aspect, a method includes, in response to receiving a search term, obtaining a mining document that includes an active tag that corresponds to the search term, identifying dynamic data in the mining document, and using the dynamic data to mine information from the data source. The dynamic data including a middleware application that is configured to mine information from a data source.

DETAILED DESCRIPTION OF PRESENT EMBODIMENTS

The present embodiments relate to active tags. Active tags may be used to dynamically mine information, for example, using dynamic data. Dynamic data may include one or more policies, applications, contextual information, one or more active tags, or other adaptive data. The dynamic data may be used to dynamically adapt to a mining context across one or more data sources. For example, in one embodiment, an active tag may be associated with an application that retrieves a current location and matches the current location with nearby hospitals. In another exemplary embodiment, an active tag may include contextual information, such as authorization information (e.g., username, password, encryption key), that may be used to access restricted information, such as medical records. In yet another exemplary embodiment, the active tag may be associated with a policy for mining. An exemplary policy may be "on Wednesday, use data source A." Other dynamical policies, application, contextual information, or one or more active tags may be associated with an active tag.

As a result of associating the active tag with dynamic data, as opposed to static data, the dynamic data may be used as a middleware layer between the active tag and the data source. In other words, the dynamic data may be used when the active tag is requested, triggered, identified, or otherwise used and has the ability to adapt to a mining context. Using dynamic data may include, for example, retrieving the dynamic data, implementing a policy, executing an application, providing contextual information, or a combination thereof.

Active tags may be used to mine information from multiple data sources. Mining information may include retrieving, requesting, pulling, or otherwise obtaining information. Mining of information from multiple data sources may be referred to as cross-domain mining, searching, or assigning. Active tags can mine data from multiple data sources, such as a global positioning system (GPS) database or phone record database. As a result, active tags provide a model for normalizing data access and tagging across multiple data sources.

FIG. 1 illustrates one embodiment of a cross-domain tagging system 100. The system 100 may include a query device 120, mining device 130, and one or more data sources 160, 170, 180. The mining device 130 may be coupled with the query device 120 via a network 101 and with one or more data sources 160, 170, 180 via networks 102, 103, 104. As used herein, the term "coupled with" may include directly connected or indirectly connected through one or more intermediary components. Intermediary components may include hardware, software, networks, or combinations thereof. The system 100 may include additional, different, or fewer components.

The networks 101-104 may be may be telecommunication networks, wireless networks, wired networks, radio networks, Internet networks, intranet networks, Transmission Control Protocol (TCP)/Internet Protocol (IP) networks, packet-based networks, fiber optic networks, telephone networks, cellular networks, computer networks, public switched telephone networks, or any other now known or later developed networks. Exemplary telecommunication networks may include wide area networks, local area networks, virtual private networks, peer-to-peer networks, and wireless local area networks. The networks 101-104 may be the same or different. For example, network 101 may be the same or different than network 102. In one embodiment, network 101 includes the Internet and network 102 includes an intranet network. The networks 101-104 may be operable to transmit messages, communication, information, or other data.

The query device 120 may be mobile device, such as a personal digital assistant or cellular telephone; personal computer; server; network device; endpoint; or other electronic device used to search for data stored on electronic equipment, such as the data sources 160, 170, 180. The query device 120 may be owned, operated, controlled, or otherwise used by a user U. The user U may be a human or an electronic device (e.g., comprising a processor and memory). The electronic device, such as a server or personal computer, may be programmed to perform mining using the query device 120. In one embodiment, the query device 120 may be integrated into the electronic device. For example, the electronic device and query device 120 may share one or more processors and/or memory. FIG. 1 shows the query device 120 and mining device 130 as independent components. However, in alternative embodiments, the query device 120 and mining device 130 may be integrated into a single device, such as a personal computer.

The query device 120 may be operable to transmit a search term 122 to the mining device 130. A search term 122 may include one or more terms, such as letters, numbers, images, or words, that are being searched for by a user U. Exemplary search terms include "nearest hospital," "recommended doctors," "current medical records," "greatest football team," "recipes for my wife," "192 count productions," "987 N. Halleberry Dr.," or other search terms.

In one illustration, which will be referred to herein as "the illustration above," Bob, who in this illustration is the User U, is searching for a medical professional that is located near Bob's office. Bob may use the query device 120, which may be a personal computer or hand-held mobile device, to search for "recommended doctors near my office." Accordingly, "recommended doctors near my office" may be the search term 122. Bob may use a search engine, such as an Internet search engine (e.g., Google®, Yahoo®, or Bing®), operating system or network search function, or phone device search (e.g., 411 or 1-800-Goo-g411) to perform the search. The search term 122 may be transmitted from the query device 120 to the mining device 130 via the network 101.

The mining device 130 may be a personal computer, server, network device, endpoint, or other electronic device used to mine for data stored on electronic equipment, such as the one or more data sources 160, 170, 180. The mining device 130 may receive the search term 122 from the query device 120. Prior to or after receiving the search term 122, the mining device 130 may obtain a mining document 132. The mining document 132 may be specific to the user U or may be generic (e.g., relating to multiple users). As shown in FIG. 1, the mining document 132 may include, describe, or identify one or more static tags 140, one or more active tags 150, or a combination thereof.

Tags may be keywords, numbers, or a combinations thereof adopted by events, administrators, conferences, participants, users, or organization machines, for use with databases, such as blog entry databases, photo databases, record databases (e.g., medical records or event records), or other types of databases. Search engines, for example, provided by or used with the mining device 130, may index tags to make relevant information searchable in a uniform way. In this case, the tag is part of a controlled vocabulary.

Figure 2:
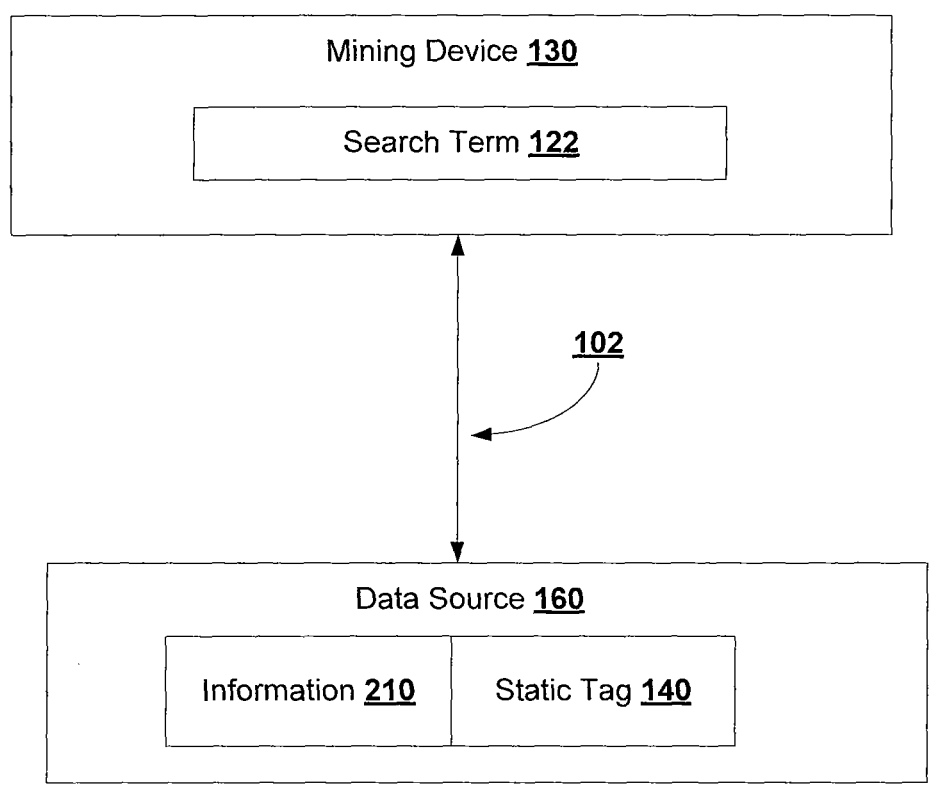
FIG. 2 illustrates an example of a static tag.

FIG. 2 illustrates a static tag 120. Static tags 140 may be used to classify, mark ownership, note boundaries, and indicate identity of information 210. Static tags 140 may take the form of one or more words, images, or other marks. Static tags 140 are directly associated with information 210 in the one or more data sources, for example, data source 160. The mining device 130 may correlate, associate, or recognize a relationship between the search term 122 and the static tag 120, which may be tagged to information 210 in the data source 160. The mining device 130 may retrieve the information 210 that was tagged with the static tag 120. Retrieving may include requesting, extracting, or pulling the information. What a static tag 140 refers to is determined by the content at the instant that the static tag 140 was tagged to the information 210.

Static tags 140 are unable to adapt to mining context. Mining context includes the interrelated conditions in which the data exists or occurs. Mining context may relate to the environment in which the data, which is being mined, exists. For example, mining context may relate to the ability to mine information, such as changing information, protected information, intelligent information, or other mining situations that require further intelligence to obtain the information. For example, static tags 140 are unable to be tagged to changing information, such as location or position information, because it is continuously or periodically changing. In another example, static tags 140 are unable to be used with protected information, such as password protected or encrypted information because the mining device 130 would be unable to access (e.g., bypass password requirement or unencrypt) the information. In yet another example, static tags 140 cannot be used to intelligently obtain information from one or more data sources. The static tag 120 works as an identifier, but does not determine or dynamically obtain information.

Figure 3:
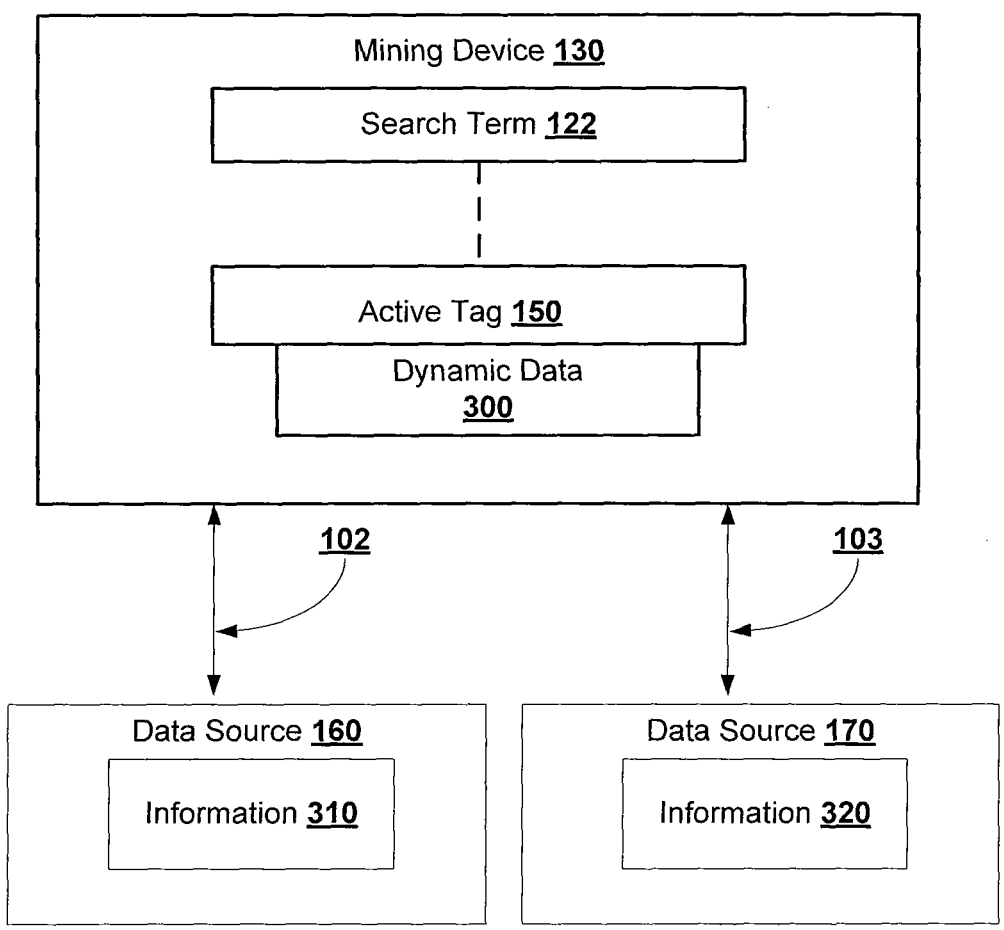
FIG. 3 illustrates one embodiment of an active tag that is associated with dynamic data that dynamically adapts to a mining context.

FIG. 3 illustrates one embodiment of a mining device 130 that uses an active tag 150 associated with dynamic data 300. The active tag 150 may be used to mine information in a mining context. Mining may include searching for, browsing for, extracting, requesting, retrieving, receiving, exploring, otherwise obtaining, or a combination thereof.

The mining device 130 may identify, associate, correlate, or otherwise recognize a relationship between a search term 122 and an active tag 150. In FIG. 3, the relationship between the search term 122 and the active tag 150 is shown with a dotted line. The mining device 130 may use a mining document 132, such as an XML document, table, database, map, chart, or other relational document, to identify or recognize the relationship between the search term 122 and the active tag 150. Identifying the relationship may include retrieving the mining document 132, for example, from memory or a device located at a remote location. Furthermore, retrieving the mining document 132 may include retrieving a mining document that is user-specific. For example, the mining device 130 may retrieve a first mining document 132 for a first user U and a second mining document 132 for a second user U, even though the same search term is received. The first mining document 132 may be the same or different than the second mining document 132.

The active tag 150 may be associated with, mapped to, linked with, or include dynamic data 300. Dynamic data 300 may include one or more policies, applications, contextual information, one or more active tags, or other adaptive information. For example, a single active tag 150 may be associated with two applications and three policies. In another example, a single active tag 150 is associated with a single application. Dynamic data 300 may be middleware.

A policy may be a rule or guide. In one embodiment, a policy is a guide that describes a deliberate plan of action to guide decisions and achieve a desired outcome. A policy may also be used to denote what is actually done, even though it is unplanned. For example, a guide may suggest or provide certain locations, such as Web-site locations, to check when searching for information. In another embodiment, the policy may be a rule that dictates mining procedures. For example, the policy may be an "if . . . then" statement.

An application may be a computer program (e.g., stored in memory and executed by a processor), middleware, or other software executed to perform mining acts. Middleware may be computer software that connects software components or applications. Middleware may include a set of services that allows multiple processes running on one or more machines to interact. Middleware may be used to access web servers, application servers, and similar tools that support application development and delivery of information. Middleware is especially integral to modern information technology based on XML, SOAP, Web services, and service-oriented architecture. Examples of middleware include EAI software, telecommunications software, and messaging-and-queuing software. Middleware may be a layer of software that lies between the application code and the run-time infrastructure. Middleware may include a library of functions, and enables a number of applications—simulations or federates in HLA terminology—to page these functions from the common library rather than re-create them for each application Contextual information may include authorization information (e.g., username, password, encryption key), relational information (e.g., linking the User U with other users), or historical information (e.g., past medical records), or other information relating to the User U or mining context.

Dynamic data 300 may be used to adapt to a mining context across one or more data sources, such as data source 160 and data source 170. The dynamic data 300 may be used to obtain information 310 and/or information 320 associated with, related to, or otherwise linked with the search term 122. The dynamic data 300 may be used to mine or receive the information 310 and/or information 320. Once the information 310, 320 is mined, the mining device 130 may transmit the information 310 and/or 320 to the query device 120. The query device 120 may output the information 310 and/or 320 for the user U to view, hear, use, or otherwise analyze.

Active tags 150 may be meta-tags that refer to one or more uniform resource identifiers (URI). URI's may include a string of one or more characters that identify or are mapped to dynamic data 300. An URI may be a tag pointer. In other words, the URI may point to dynamic data 300. When used, the dynamic data 300 may return a computed value. In order to determine the value to return, the tag pointer may need to provide appropriate credentials so that the tag may allow appropriate access depending on the credentials provided. Tags could also be combination of other tags, and hence may need multilevel computation in order to return a value.

The URIs may be in a single domain or a plurality of domains. For example, the URIs may be in the same domain or different domains. The URI may be mapped to the dynamic data 300. For example, the URI may map into a PHP script running on the mining device 130, which extracts global positioning system (GPS) information from the phone, or it could be mapped into the phone itself which responds with the location. In another example, instead of statically referring to a news item, the active tag 150 refers to a URI which returns a computed value when reference to the active tag is made. In order to determine the value to return, the tag pointer may need to provide appropriate credentials so that the tag may allow appropriate access depending on the credentials provided.

PHP may be referred to as "personal home page." PHP may be a general-purpose scripting language that was originally designed for web development to produce and access dynamic web pages. PHP code is embedded into the Hyper Text Markup Language (HTML) source document and interpreted by a web server with a PHP processor module, which generates the web page document. As a general-purpose programming language, PHP code is processed by an interpreter application in command line mode performing desired operating system operations and producing program output on its standard output channel. PHP may also function as a graphical application. PHP is available as a processor for most modern web servers and as standalone interpreter on almost every operating system and computing platform.

Active tags 150 may be meta-tags in the sense that they can be combinations of existing tags or meta-tags. In one embodiment, an active tag 150 may include dynamic data that includes one or more additional active tags. The additional active tags in the dynamic data may be the same or different than the active tag 150. The additional tags may be called, discovered, retrieved, or otherwise obtained using the dynamic data associated with the active tag 150. The tag bindings are determined against the entire Internet rather than a specific database. Active tags 150 may be decentralized rather than stored in a single location. Accordingly, active tags 150 may be used to obtain information deep inside a data source or records.

Active tags 150 may be evaluated, mapped, used, or executed at the time of the search term 122 is received; not at the time the active tag 150 was created or linked. As a result, one difference between static tags 140 and active tags 150 is time based. In other words, static tags 140 and active tags 150 will obtain different results because they retrieve information associated with different times. For example, static tags 140 may be used to retrieve information from a time period at which the static tag 140 was tagged. Whereas, active tags 150 may be used to obtain information at a time when the search term 122 was received. Active tags 150 may need multilevel computation in order to return a value.

Active tags 150 are able to adapt to a mining context. In one embodiment, active tags 150 are able to adapt to all mining context. As will be illustrated in the examples of FIGS. 4-6, active tags 140 are able to be used to retrieve changing information, protected information, and combination information. Changing information is information that continuously or periodically changes, such as a list of contacts, calendar information, or traffic information. Protected information is information that is protected with an authorization requirement or encryption requirement. Combination information is information that is received from one or more data sources and combined with other information.

Figure 4:
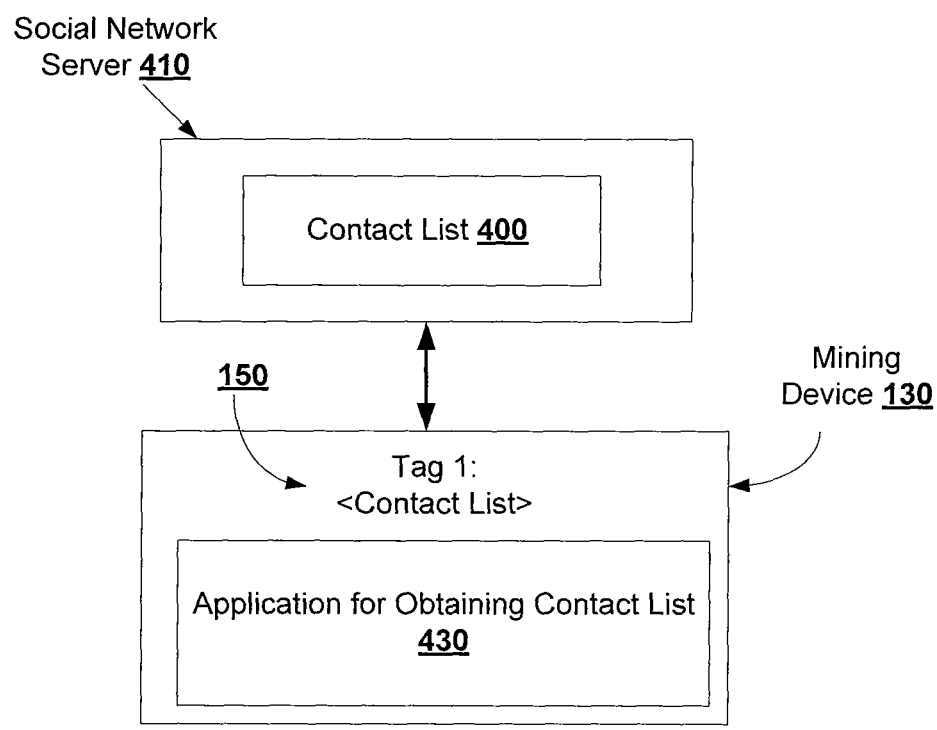
FIG. 4 illustrates one embodiment of an active tag that is associated with an application for obtaining changing information.
Figure 5:
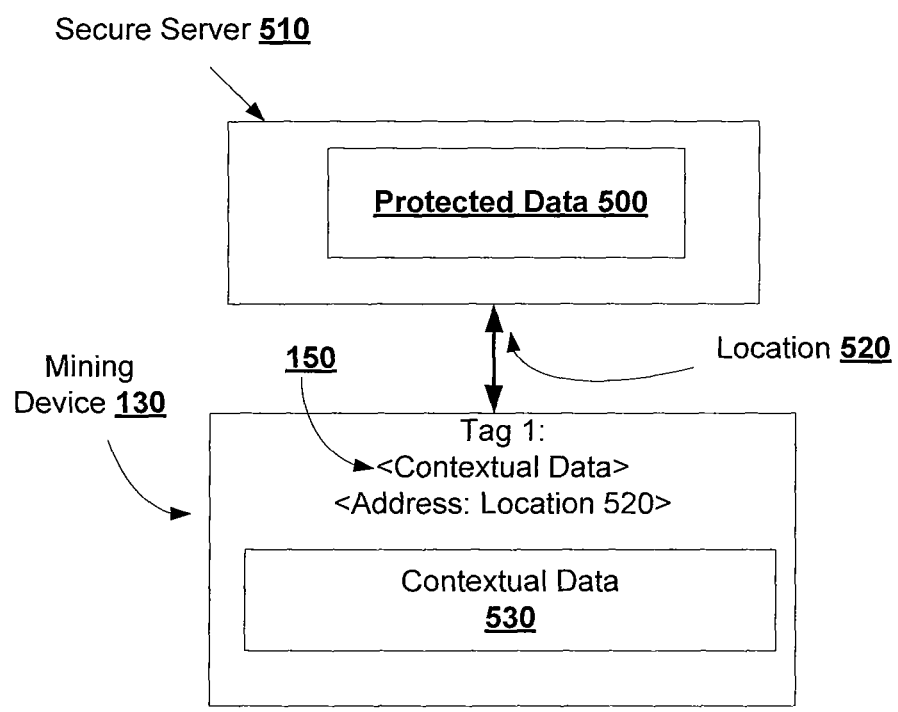
FIG. 5 illustrates one embodiment of an active tag that is associated with private data that is used for obtaining protected data.
Figure 6:
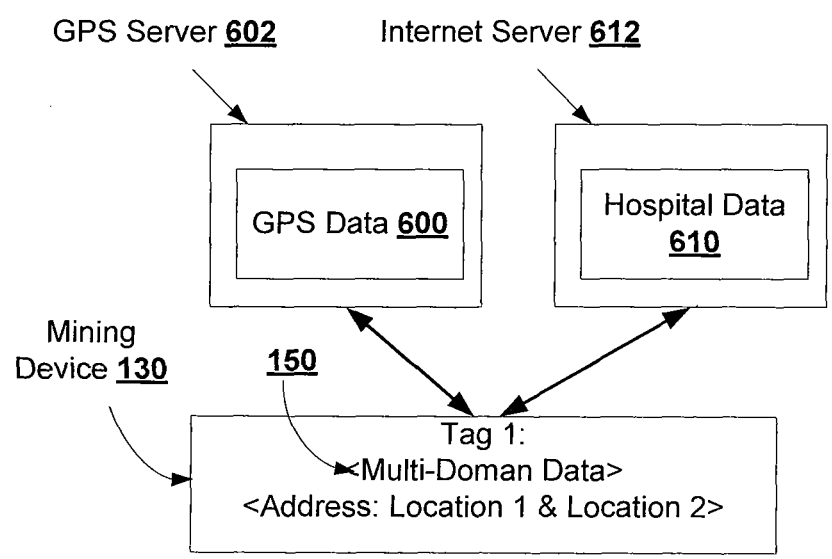
FIG. 6 illustrates one embodiment of an active tag that is associated with an application that intelligently retrieves and combines data from multiple data sources.

Active tags 140 should not be limited to the examples shown in FIGS. 4-6. Active tags 140 may be used to dynamically adapt, for example, using the dynamic data 300, to any mining context. Furthermore, in other systems, active tags 150 may be referred to as dynamic tags, instant tags, late-binding tags, labels, policy-enabled tags, or tags. In alternative embodiments, active tags 150 may not even be referred to as tags. Instead, active tags 150 may simply be referred to as dynamic data, applications, policies, or contextual data.

FIG. 4 illustrates one embodiment of an active tag 150 used to obtain changing information. For example, a contact list 400 may periodically change. The contact list 400 may be part of or associated with a social networking service (e.g., Facebook®, Linked-In®, or e-Harmony.com®), phone device, or database of contacts. The contact list 400 may be the User's U contact list or associated with another person. In this example, the contact list 400 is a social network contact list, such as a list of acquaintances, friends, family, or co-workers. The social network contact list 400 may be stored on a social network server 410. To obtain the up-to-date contact list 400, an active tag 150 may be associated with an application 420 that obtains the contact list 400. Accordingly, each time the active tag 150 is used, for example, executed, the up-to-date contact list 400 may be obtained. A static tag 140 may be used to obtain a single contact list and not the up-to-date contact list. In other words, static tags 140 may be used to obtain a single, non-changing contact list. Whereas, an active tag 150 may be used to obtain information that changes.

FIG. 5 illustrates one embodiment of an active tag 150 used to obtain protected data 500 located in the secure server 510, which may be accessed by communicating with the address 520. The active tag 150 may be associated with contextual data 530. Contextual data 530 may be private data, such as security information or encryption information, or other adaptive data. The contextual data 530 may be used to obtain information that is protected, for example, with a password or encryption. The contextual data 530 may be associated with a specific address, such as the location address 520. Accordingly, when the active tag 150 is used, the mining device 130 uses the contextual data 530 to access the secure server 510 and obtain, retrieve, or request the protected data 500.

FIG. 6 illustrates one embodiment of an active tag 150 used to obtain multi-domain information. Multi-domain information is information that is combined from one or more data sources. A model is presented where tags are cross-domain in the sense that tags exist in multiple systems and can refer to multiple URIs distinct from the tag locations. The cross-domain tagging systems may interact or be combined with each other. For example, a first set active tags 150 may refer to a patient's medical record located on a medical record website on a medical provider server. A second set of active tags may refer to doctor recommendations in a directory (e.g., yellow pages) website which is located on a directory server. A third set of active tags refers to "My Friends" or contact grouping on a social network server. An application can combine these sets of tags to find the doctors that my friends have recommended who can address a specific medical condition. The data may be located in separate locations, the tags are in another set of locations and there are policy controls to determine which tags my application can access.

As shown in FIG. 6, a mining device 130 may use an active 150 to obtain, retrieve, or request data from multiple domains. Domains relate to realms of administrative autonomy, authority, or control. A domain may include one or more networking devices and may be controlled by one or more administrators. In the example of FIG. 6, the global positioning system (GPS) server 602 may be owned by the same or different owner than the Internet server 612. The mining device 130 may execute an application for retrieving and combining data from multiple data sources, such as the GPS server 602 and Internet server 612. For example, in the illustration above, the mining device 130 may obtain location information (e.g., GPS data 600) from the GPS server 602 and hospital location information (e.g., hospital data 610) from the Internet server 612. The retrieved information may be compared and/or combined to provide a search result.

One benefit of an active tag 150 is that accurate, up-to-date information 310 may be retrieved. Since the active tag 150 is associated with dynamic data 300, instead of, for example, the actual information being searched for, the dynamic data 300 may be used to obtain information in real time, as opposed to information that was originally associated with a static tag 120.

In one embodiment, active tag 150 may be used to mine information from multiple data sources. Accordingly, the active tag may be used to obtain information from a first data source and combine the information with information from a second data source. The dynamic data associated with the active tag may be used to intelligently obtain and combine the information in the first and second data sources.

The mining device 130 may use an active tag 150 to obtain information from a plurality of data sources 160, 170, 180. The information may be combined or aggregated.

One advantage of using active tags 150 is that active tags can be implemented in a middleware layer that is policy-enabled, and hence have access deeper than conventional tagging would allow, such as medical records. The policy mechanism can be further extended to applications so that an application can access a subset of tags as determined by the tag owner. Tags can be cross-domain and exist separately from the content. Tags can be late-binding and be evaluated at the instant of use e.g. location. Tags can be driven off multiple real time and passive sources. Tags can be meta-tags that are combinations of other tags.

Referring back to FIG. 1, the mining device 130 may return a search result to the query device 110. The search result may include information obtained using the dynamic data 300. For example, in the illustration above, the mining device 130 may return a list of nearby hospitals that are recommended by the User 1's friends on Facebook® as the search result.

Figure 7:
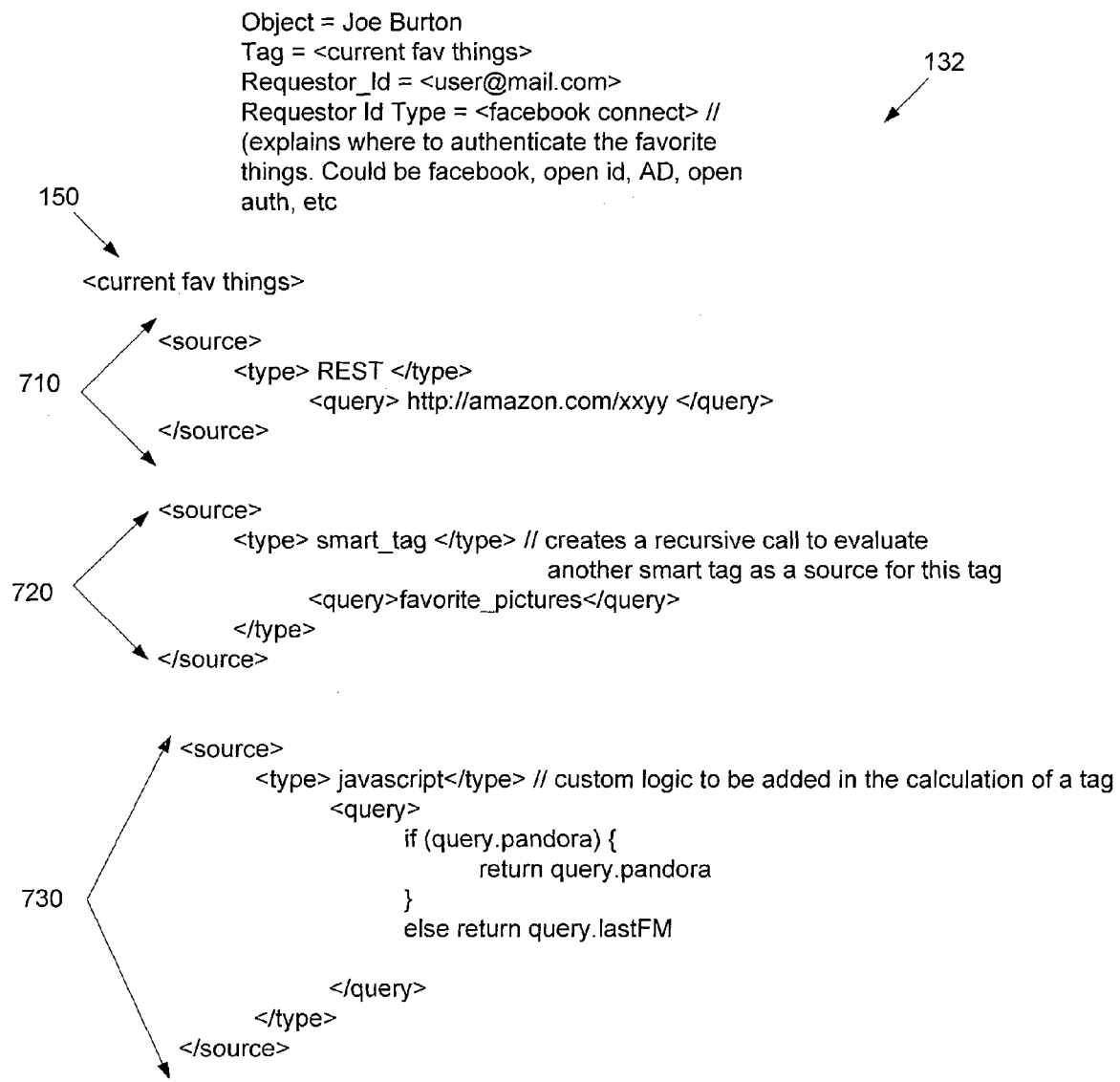
FIG. 7 illustrates one embodiment of a mining document that includes active tags.

FIG. 7 illustrates one example of a mining document 132 including an active tag 150 associated with location 710, an application to evaluate another active tag 720, and an application 730. The mining document 132 is a XML document that includes an active tag 150 mapped to dynamic data 710, 720, 730. The location 710 may be used to mine information from the location 710. The location 710 may be an address, such as a Web address, network address, or other address. The application 720 may be used to retrieve and execute another active tag. Associating other active tags with an active tag 150 allows for complex mining. Accordingly, deeper, richer results may be obtained. The application 730 may be any application that is executed to obtain data from one or more data sources. The data sources may be in the same or different domains.

Figure 8:
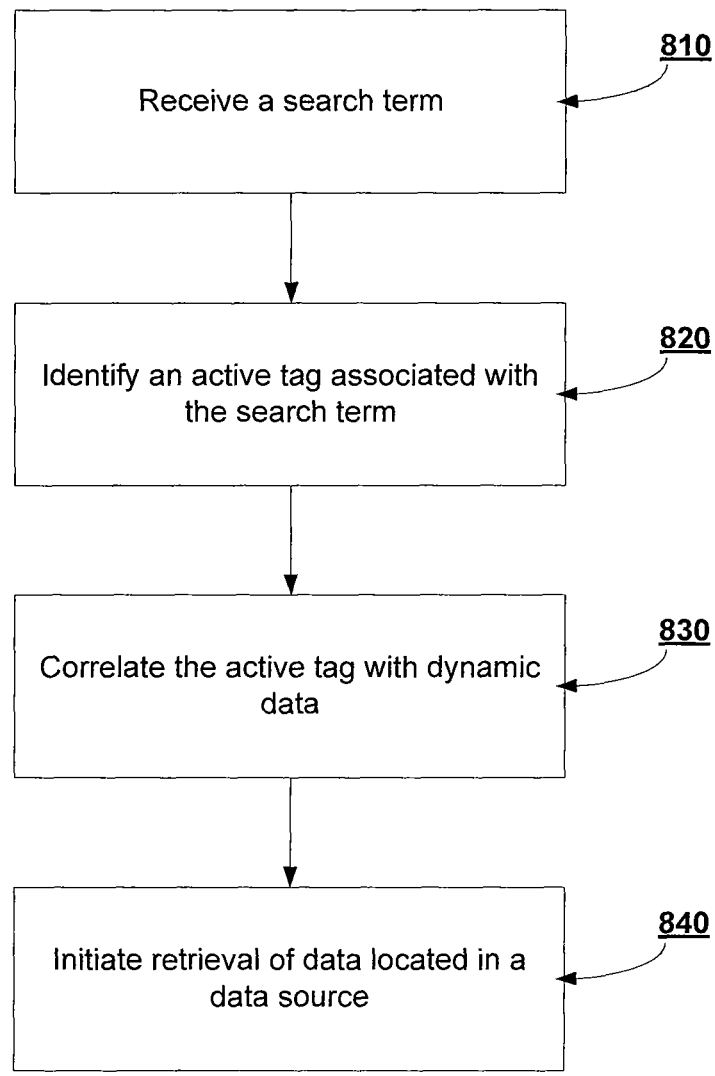
FIG. 8 illustrates a method for obtaining information from a data source.

FIG. 8 illustrates one embodiment of a method 800 for retrieving information from one or more data sources. The method 800 may include receiving a search term 810; identifying an active tag associated with the search term 820; correlating the active tag to dynamic data 830; and retrieving the data using the dynamic data 840. The method 800 may include additional acts. For example, the method 800 may include returning a search result to a query device. The search result may be a combination or aggregation of data retrieved using the dynamic data.

In act 810, a mining device receives a search term. Receiving the search term may include receiving a search term and manipulating the term by adding, deleting, or amending the search term. For example, "my favorite places" may be changed to "User U's favorite places." Other changes may be made. In act 820, the mining device identifies an active tag associated with the search term. Identifying an active tag may include, in response to receiving a search term, obtaining a mining document that includes an active tag that corresponds to the search term, identifying dynamic data in the mining document, the dynamic data including a policy, application, contextual information, or a combination thereof that is configured to mine information from one or more data sources. For example, an application, such as a middleware application, may be configured to mine information from a plurality of data sources. The middleware application may be configured to use authorization information or other contextual information to access secure information. The mining document may be, for example, an XML document. In act 830, the mining device correlates the active tag to dynamic data that is operative to adapt to a mining context in which data is stored. In act 840, the mining device retrieves the data using the dynamic data. Using the dynamic data may include executing the middleware application with a processor.

Various embodiments described herein can be used alone or in combination with one another. The foregoing detailed description has described only a few of the many possible embodiments.

We claim:

1. A method, comprising:
receiving, over a network and from a first device of a user, a search term and contextual data, wherein the contextual data comprises a username, a password, a current location of the first device, and relational data linking the user with at least one other user of a second device;
identifying an active tag associated with the search term, wherein the active tag includes at least one policy rule;
correlating, using a processor of a mining device, the active tag to dynamic data that is stored at the mining device, wherein the dynamic data is used to obtain data stored on at least one data source external to the mining device, wherein the dynamic data is changing over time;
authorizing access to restricted information using at least the dynamic data stored at the mining device and the relational data linking the user with the at least one other user of the second device; and
retrieving restricted information according to at least the at least one policy rule, the current location of the first device, the relational data linking the user with the at least one other user of the second device, and the dynamic data stored at the mining device.

2. The method of claim 1, wherein identifying the active tag includes matching the search term with active tags related to the search term and selecting the active tag.

3. The method of claim 1, wherein the correlating the active tag includes mapping the active tag to the dynamic data, and wherein the mapping includes using a mining document that relates the active tag and the dynamic data.

4. The method of claim 1, wherein the at least one data source includes a plurality of data sources.

5. The method of claim 4, wherein the data includes a contact list from each of the plurality of data sources.

6. The method of claim 4, wherein each of the plurality of data sources is a different social network server.

7. The method of claim 1, wherein the contextual data further comprises historical data related to the restricted information.

8. A mining device, comprising:
a processor; and
a memory coupled with the processor, wherein the memory stores instructions operable to:
receive a search term and contextual data from a first device of a user, wherein the contextual data comprises a username, a password, a current location of the first device, and relational data linking the user with at least one other user of a second device, and wherein the contextual data is usable with dynamic data stored in the memory to obtain access to restricted information;
identify an active tag associated with the search term, wherein the active tag includes at least one policy rule;
correlate the active tag to the dynamic data stored in the memory, wherein dynamic data points to data at a plurality of external locations; and
retrieve restricted information according to at least the at least one policy rule, the current location of the first device, the relational data linking the user with at least one other user of the second device, and the dynamic data stored in the memory.

9. The mining device of claim 8, wherein the memory further includes instructions operable to map the active tag to the dynamic data.

10. The mining device of claim 8, wherein the memory further includes instructions operable to transfer the information to the first device as a search result.

11. The mining device of claim 8, wherein the plurality of external locations includes a plurality of social networking service contact lists.

12. The mining device of claim 8, wherein the contextual data further comprises historical data related to the restricted information.

13. A method, comprising:
in response to receiving a search term from a first device used by a user, obtaining a mining document that includes an active tag that corresponds to the search term;
identifying dynamic data in the mining document, the dynamic data including a middleware application that is configured to identify a data source based on a current location of the first device and mine information from the data source based on at least one policy rule, wherein the middleware application lies in a layer between the data source and the first device and the layer includes a library of functions accessible by a plurality of dynamic data applications; and
using the dynamic data to mine information from the data source according to the policy rule and contextual data, wherein the contextual data comprises a username, a password, and relational data linking the user with at least one other user of a second device.

14. The method of claim 13, wherein the middleware application is configured to mine information from a plurality of data sources.

15. The method of claim 14, wherein the plurality of data sources are in different domains.

16. The method of claim 13, wherein the middleware application is configured to use authorization information in the contextual data to access secure information.

17. The method of claim 13, wherein the contextual data further comprises historical data related to the mined information.

\* \* \* \* \*